(12) United States Patent
Reinsch

(10) Patent No.: US 6,767,045 B2
(45) Date of Patent: Jul. 27, 2004

(54) LOWERABLE MOTOR VEHICLE ROOF FOR A CABRIOLET

(75) Inventor: Burkhard Reinsch, Kaufbeuren (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/269,082

(22) Filed: Oct. 11, 2002

(65) Prior Publication Data
US 2003/0085587 A1 May 8, 2003

(30) Foreign Application Priority Data
Oct. 12, 2001 (DE) .......................................... 101 50 219

(51) Int. Cl.⁷ .................................................. B60J 7/14
(52) U.S. Cl. .................................. 296/107.17; 296/108
(58) Field of Search ............................. 296/108, 116, 296/117, 107.09, 107.17, 107.16, 107.01

(56) References Cited

U.S. PATENT DOCUMENTS

| 3,271,067 A | 9/1966 | Rollman |
| 6,478,362 B2 * | 11/2002 | Obendiek .................. 296/108 |
| 6,572,175 B2 * | 6/2003 | Schutt et al. ............... 296/108 |

FOREIGN PATENT DOCUMENTS

| DE | 199 26 474 A1 | 12/2000 |
| DE | 199 34 673 C1 | 1/2001 |
| DE | 199 62 070 A1 | 7/2001 |
| DE | 101 08 493 A1 | 9/2001 |
| JP | 402306822 A * | 12/1990 ................. 296/108 |
| WO | WO 01/40007 A1 | 6/2001 |

* cited by examiner

*Primary Examiner*—Jason Morrow
(74) *Attorney, Agent, or Firm*—Nixon Peabody LLP; David S. Safran

(57) ABSTRACT

A motor vehicle roof with a front first roof part (3) and a following second roof part (4) which can be displaced between a closed position which covers the motor vehicle interior and a lowered position in a rear roof storage space (10) which exposes the motor vehicle interior. The front roof part (3) is movably supported by a laterally arranged multiple hinge linkage (14, 15) on the second roof part (4) and is raisable over the second roof part (4) when being lowered. In order to devise a stable and still space-saving support for the front roof part (3), the rear connecting rod (15) of the multiple hinge linkage (14, 15) is supported on the second roof part (4) to be able to pivot around a pivot axis (29) which is set back from its front edge (22) and swings upward out of the roof surface (23) of the second roof part (4) when the roof (1) is being lowered.

15 Claims, 18 Drawing Sheets

LOWERABLE MOTOR VEHICLE ROOF FOR A CABRIOLET

BACKGROUND OF THE INVENTION

1. Field of the Invention

The invention relates to a lowerable motor vehicle roof with at least one front first roof part and a following second roof part which can be displaced between a closed position which covers the motor vehicle interior and a lowered position in a rear roof storage space which exposes the motor vehicle interior, the front roof part being movably supported by means of laterally arranged multiple hinge means on the second roof part and being raisable above the second roof part during lowering.

2. Description of Related Art

Published German Patent Application DE 199 62 070 A1 discloses a motor vehicle roof in which the front roof part is coupled by a four-bar mechanism to the middle roof part of a three-part roof The two connecting rods of the four-bar mechanism are pivotally supported by hinges which are close by one another on a bracket which projects far forward from the middle roof part. The coupling to the bracket is located far forward of the middle roof part so that the connecting rods which swivel back with the front roof part do not collide with the middle roof part. The disadvantage here is that only comparatively little stability of support of the front roof part by the hinges which are close by one another is possible.

German Patent DE 199 34 673 C1 discloses a motor vehicle roof with three movable roof parts in which the middle roof part is supported on the motor vehicle by means of a main four-bar mechanism, the front roof part is supported by means of a four-bar mechanism on the middle roof part, and the rear roof part is attached to the rear main connecting rod of the main four-bar mechanism and can be swiveled with it. The roof parts are deposited on top of one another in the trunk of the motor vehicle such that the rear roof part is disposed bottom side up, while the front roof part is located over the middle roof part in the identically cambered position and is lowered so that the top side faces up. In this vehicle roof, the pivot bearings of the two connecting rods of the front four-bar mechanism are located near one another on a bracket projecting to the front from the middle roof part with the corresponding disadvantages for stability.

SUMMARY OF THE INVENTION

The primary object of the invention is to devise a motor vehicle roof of the initially mentioned type which has improved support of the first roof part on the second roof part and improved driving of the support.

This object is achieved by the invention in the aforementioned type of motor vehicle roof in that the rear connecting rod of the multiple hinge means is supported on the second roof part to be able to swing around a pivot axis which is set back from its front edge and when the roof is lowered swings up and out of the roof surface of the second roof part. By means of the set-back pivot axis, a greater bearing distance between the support of the rear connecting rod and the front connecting rod of the multiple hinge means on the second roof part is achieved without the need to support the front connecting rod on the bracket very far in front of the roof surface of the second roof part without, in turn, creating the disadvantage that the second roof part would be overly lengthened by this bracket.

Preferably, the rear connecting rod, in the closed position of the roof, is flush with the roof surface of the second roof part or is located underneath the roof surface. The connecting rod can also be integrated in a corresponding elevation of the roof surface. In any case, it emerges upward without lateral motion out of the roof surface. In this configuration, it is feasible to accommodate the rear connecting rod in an upwardly open in the second roof part in the closed position. The recess is, for example, a lengthwise channel between the middle part of the roof and the side part of the roof.

In order to form a pivot angle that is as large as possible, it can be provided that the rear connecting rod, in the open position, is lowered at least partially into the rear section of the recess. Thus, the first roof part can be lowered directly onto the second roof part.

In order to improve the visual appearance of the motor vehicle roof in the closed position, it is possible to provide a screen that covers the rear section of the recess from the rear connecting rod to the rear. The screen can be pressed down by pivoting-back the connecting rod into the recess.

The object is also achieved in the initially mentioned motor vehicle roof in that the front connecting rod of the multiple hinge means is pivotally supported by means of a pivot bearing which is located on the bracket which projects forward on the second roof part in front of the roof surface of the second roof part, and that the front connecting rod is driven via a lever gear. The lever linkage also allows a drive force to be applied even for a large pivot angles of the front connecting rod so that dead center positions in the two end positions of swinging motion can be avoided and a larger lever arm is available for applying force even in the vicinity of the end positions.

These means can be used both in hardtop motor vehicle roofs with two roof parts and also with three or more roof parts.

The motor vehicle roof is explained detail below with reference to preferred embodiments and with reference to the accompanying drawings.

DETAILED DESCRIPTION OF THE INVENTION

Figure 1:
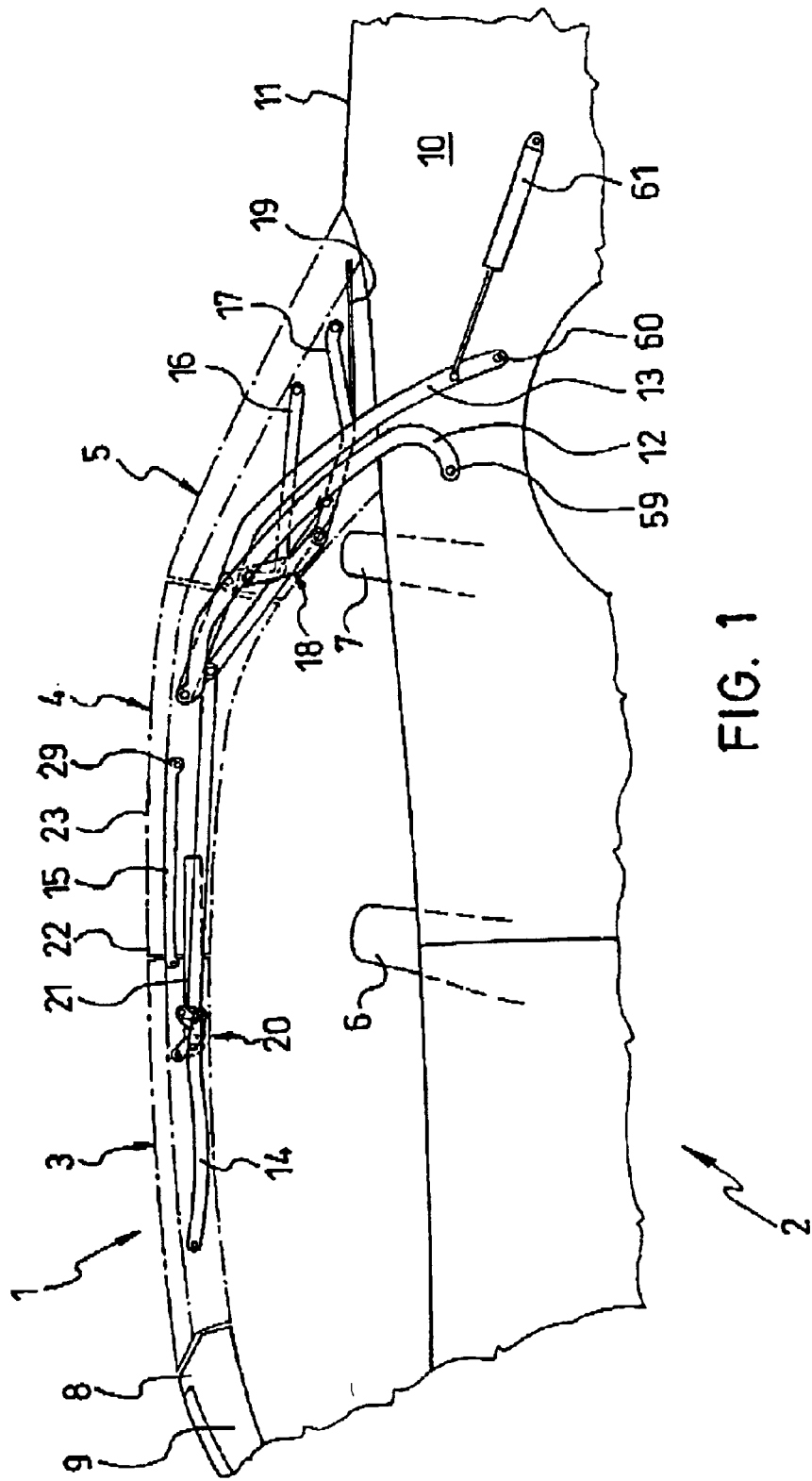
FIG. 1 is a schematic side view of a portion of a cabriolet with a hardtop vehicle roof having a front, a middle and a rear roof part, the roof being in a closed position.

A motor vehicle roof 1 of a cabriolet 2 is made as an openable hardtop with a front roof part 3, a second or middle roof part 4 and a rear roof part 5 (see FIG. 1). The cabriolet 2 can have one row of seats or a front 6 and a rear row 7 of seats, as shown in FIG. 1, so that the lengths of the individual roof parts 3, 4, 5 are matched to the respective length of the motor vehicle interior. When the motor vehicle roof 1 is opened and lowered after the front roof part 3 has been decoupled from the windshield apron 8 or from the A columns 9, the front roof part 3, the middle roof part 4 and the rear roof part 5 are lowered into a roof storage space, i.e., convertible top compartment 10, which is located behind the back row 7 of seats in the rear area of the cabriolet 2, and can be covered by the lid 11 of the convertible top compartment or trunk.

The three roof parts 3, 4, 5 are pivotally supported via the supports which are shown in the figures and which are each provided on either side on the roof parts. The middle roof part 4 is pivotally supported by means of a main four-bar mechanism which has a main connecting rod 12 and a main column 13 on the body such that it its top surface faces upward when stowed in the convertible top compartment 10. The front roof part 3 is pivotally supported by means of a four-bar mechanism which contains a front connecting rod 14 and a rear connecting rod 15 on the middle roof part 4 and when lowered, its top surface, likewise, faces upward and it is disposed over the middle roof part 4. The rear roof part 5 or the rear element, which contains, for example, a rear window, is pivotally supported by means of a front lever 16 and a rear lever 17 in an arrangement of the four-bar mechanism on the bearing arm 18 which is attached to the middle roof part 4 and projects to the rear over its back end.

When the hardtop roof 1 is lowered, the front roof part 3 is swung onto the middle roof part 4 and the rear roof part 5 is swung onto the front roof part 3. This compact, uniformly cambered unit then is swung into the convertible top compartment 10. The lowering motion is accomplished by pivoting the main four-bar mechanism 12, 13 which also pivots the front four-bar mechanism 14, 15 and the rear four-bar mechanism 16, 17, for example, via kinematic forced coupling. The lowering motion of the three roof parts 3, 4, 5 takes place continuously (see FIGS. 2 to 7). When the roof 1 is lowered, the lid 11 of the convertible top compartment is raised with the hat rack 19 supported on it (see FIG. 3, 11' and 19' designate the rest position of the lid of the convertible top compartment and the hat rack) and is swung up with at its front edge 58 into the open position (FIG. 4), while the hat rack 19 which is movably supported on the lid 11 of the convertible top compartment is pushed to the rear to under the lid 11 of the convertible top compartment. Further pivoting of the main four-bar mechanism 12, 13 lowers the front roof part 3 onto the middle roof part 4 and swings the rear roof part 5 onto the front and the middle roof part 3 and 4 (FIG. 5 & 6) until all three roof parts 3, 4, 5 have been lowered completely into the convertible top compartment 10 in a stacked arrangement in which the roof parts all face in the same direction, whereupon the lid 11 of the convertible top compartment is swung back down again and the hat rack 19 extends forward and finally assumes its cover position (FIG. 7).

Figure 8:
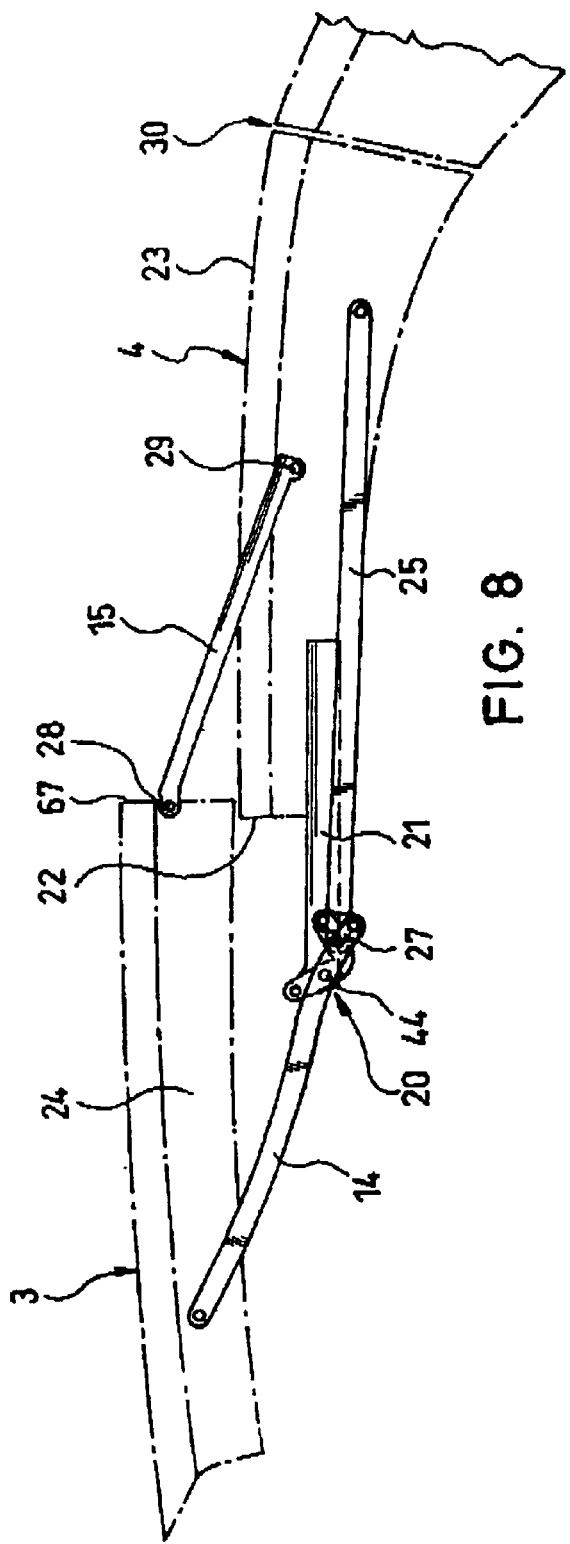
FIG. 8 is an enlarged a side view of the front roof part when being swung up over the middle roof part.

The front connecting rod 14 of the front four-bar mechanism, which supports the front roof part 3, is pivotally supported by means of a lever linkage 20 on the front end of the bracket 21 (see especially FIG. 8) which is attached to the middle roof part 4 and extends forward beyond the front edge 22 of the roof shell 23 of the middle roof part 4 in an arrangement such that it is covered by the side area 24 of the front roof part 3 in the closed position. The front drive or coupling rod 25 for swinging the front connecting rod 14 is coupled by means of the rear hinge 26 on the main connecting rod 12 and by means of the front hinge 27 on the lever linkage 20.

Figure 13:
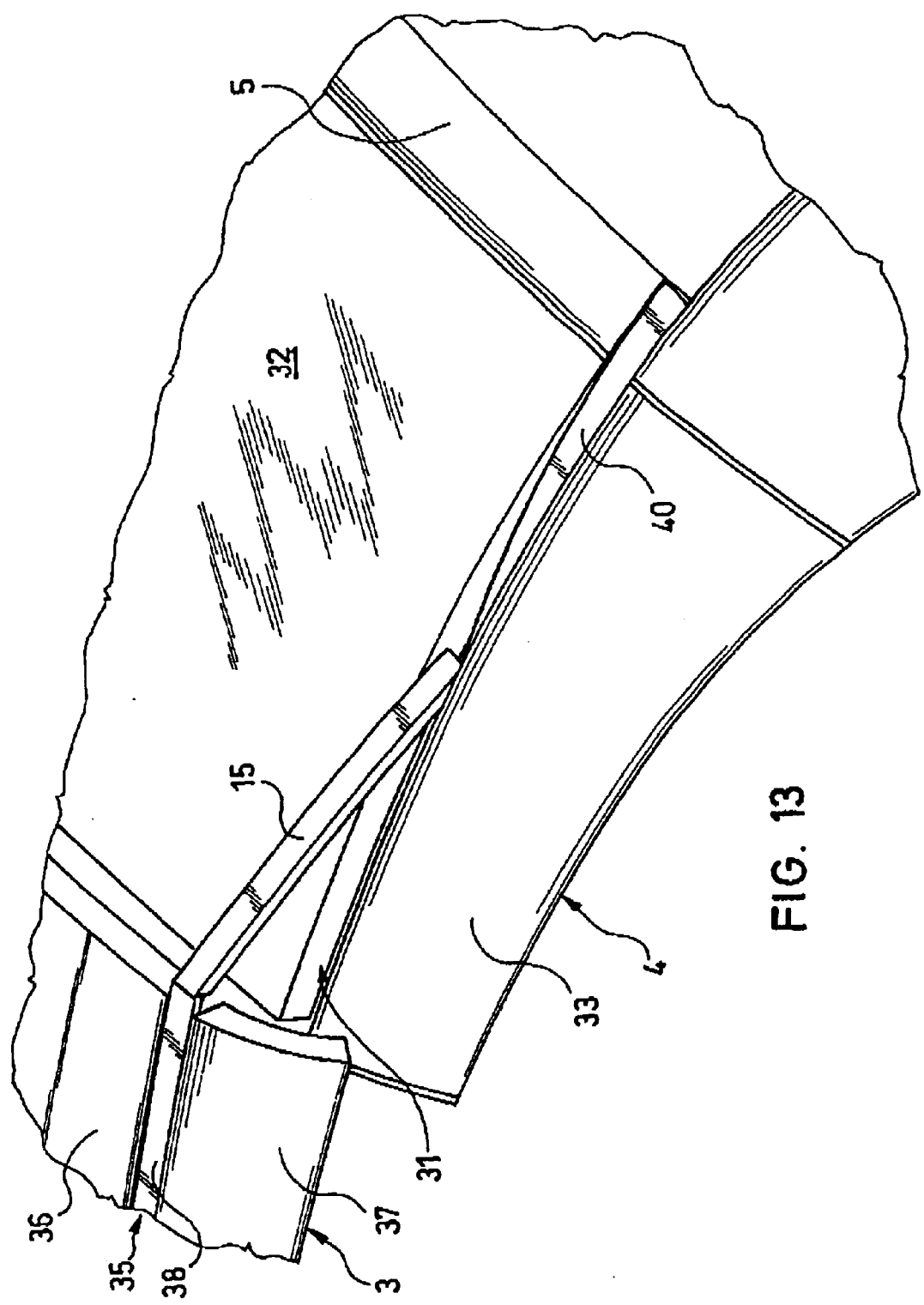
FIG. 13 is a perspective overhead view of the roof when the front roof part is being swung up over the middle roof part.

The front end of the rear connecting rod 15 is pivotally coupled by means of the hinge 28 on the back end 67 of the front roof part 3. The back end of the rear connecting rod 15 is pivotally supported by means of a hinge 29 which is located on the middle roof part 4 roughly in the middle between the front edge 22 and the rear edge 30 of the roof shell 23 and is lowered relative to the surface of the roof shell 23 so that the rear connecting rod 15, in the closed position of the roof 1, is accommodated in a recess 31 which is in the form of a lengthwise groove or channel which extends between the middle section 32 and the side section 33 (see FIG. 13) of the middle roof part 4 over its length. The recess 31 is, for example, a so-called weld groove in which the two adjacent side edges of the middle section 32 or of the side section 33 which are directed downward are joined to one another, for example, by welding.

Figure 9:
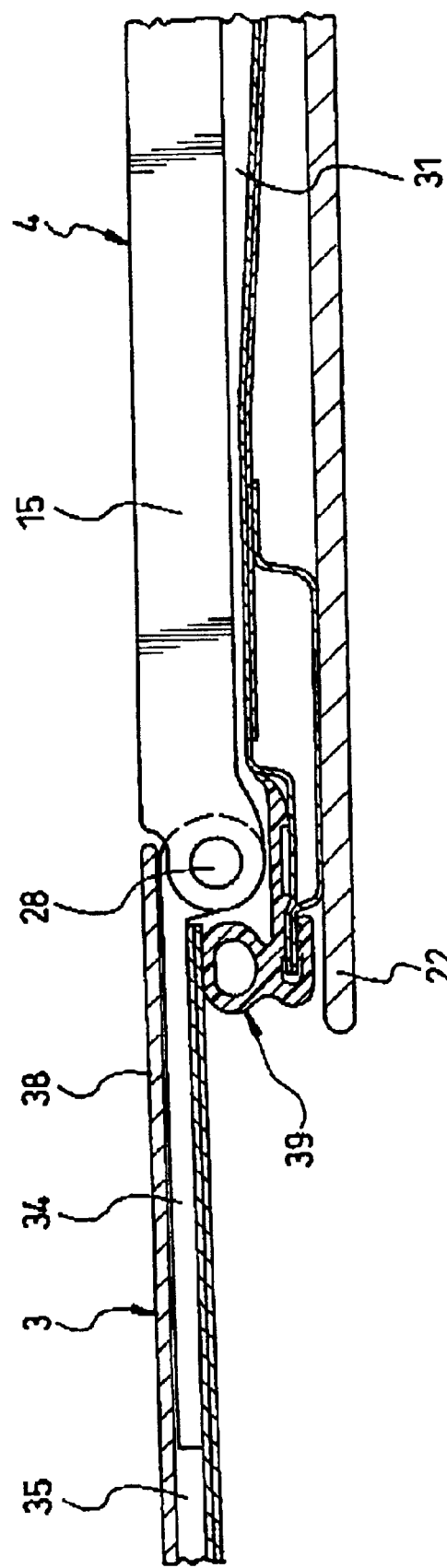
FIG. 9 is a partial schematic side view of the connecting rod connection of the four-bar mechanism between the front roof part and the middle roof part.

The front hinge 28 of the rear connecting rod 15 is attached to an elongated bearing part 34 (FIG. 9) which is accommodated in a recess 35 which has been formed, for example, likewise by the weld groove between the middle section 36 and the side section 37 of the front roof part 3 (FIG. 13) and is attached thereto. A screen or cover 38 covers the recess 35 with the bearing part 34 held therein flush with the surface of the front roof part 3.

The weld groove or the recess 31 on the middle roof part 4 forms a wet area (i.e., an area exposed to the elements and into which water running over the roof may enter) which is bordered forward by the seal 39 which is attached to the front edge 22 of the middle roof part 4. In the closed position of the roof 1, the seal 39 tightly adjoins the bottom of the front roof part 3.

Figure 10:
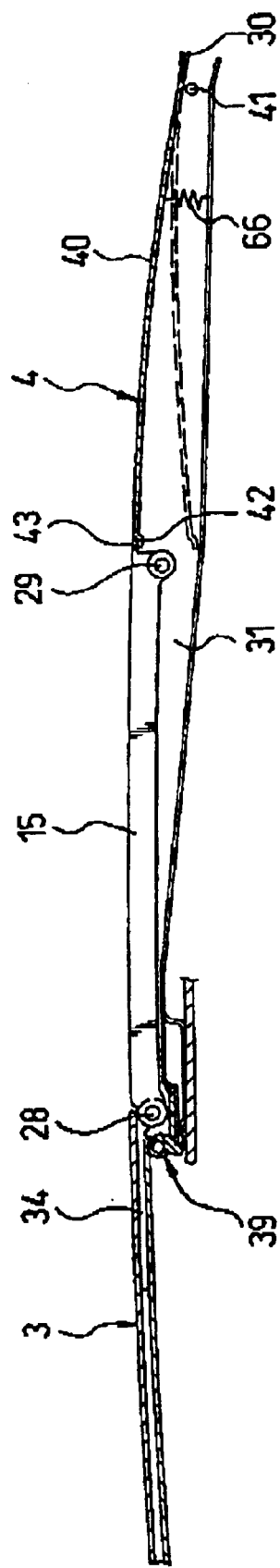
FIGS. 10 to 12 are respective schematic side views of the rear connecting rod of the four-bar mechanism when the front roof part is swung onto the rear roof part.
Figure 11:
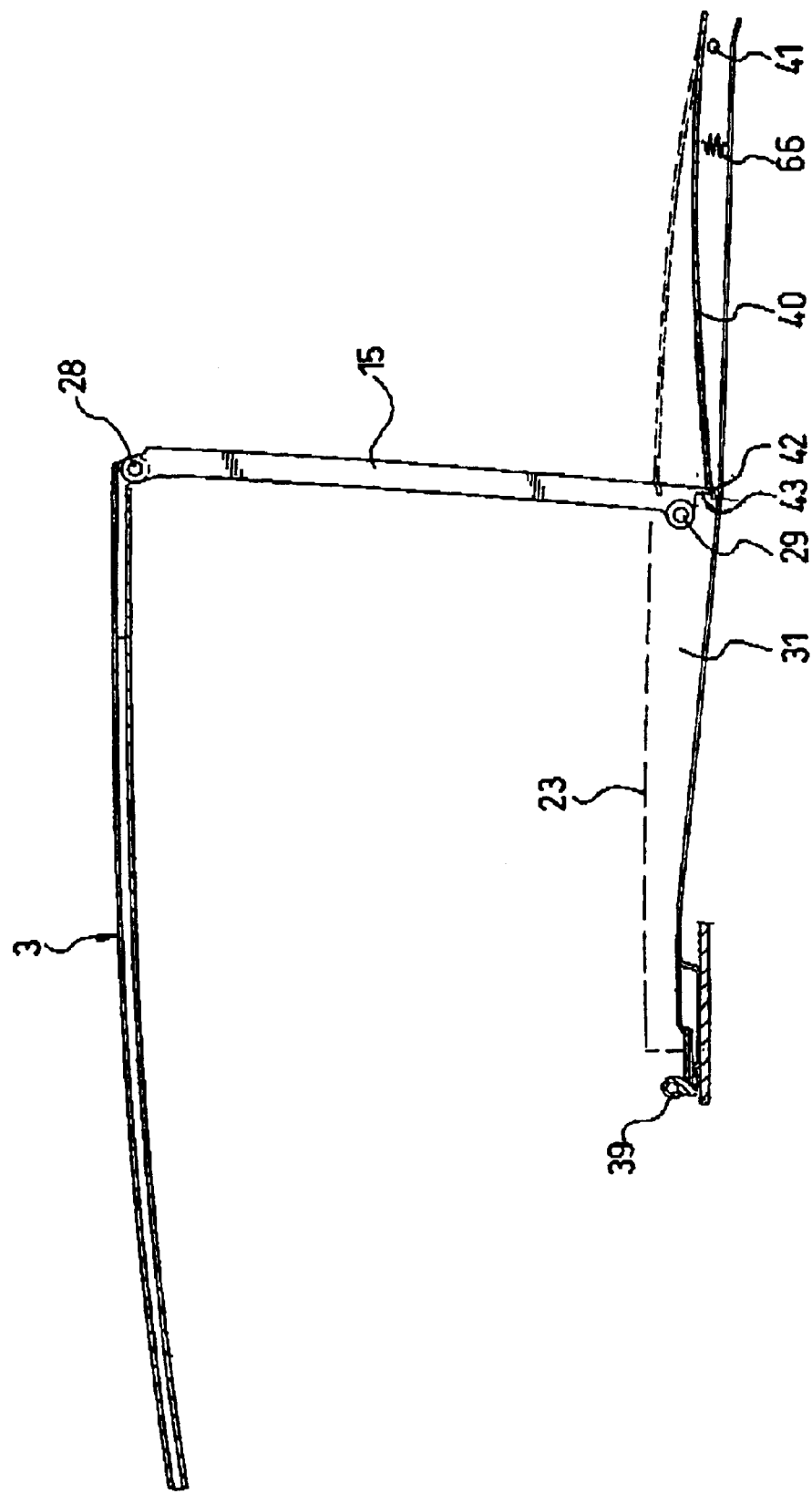
Figure 12:
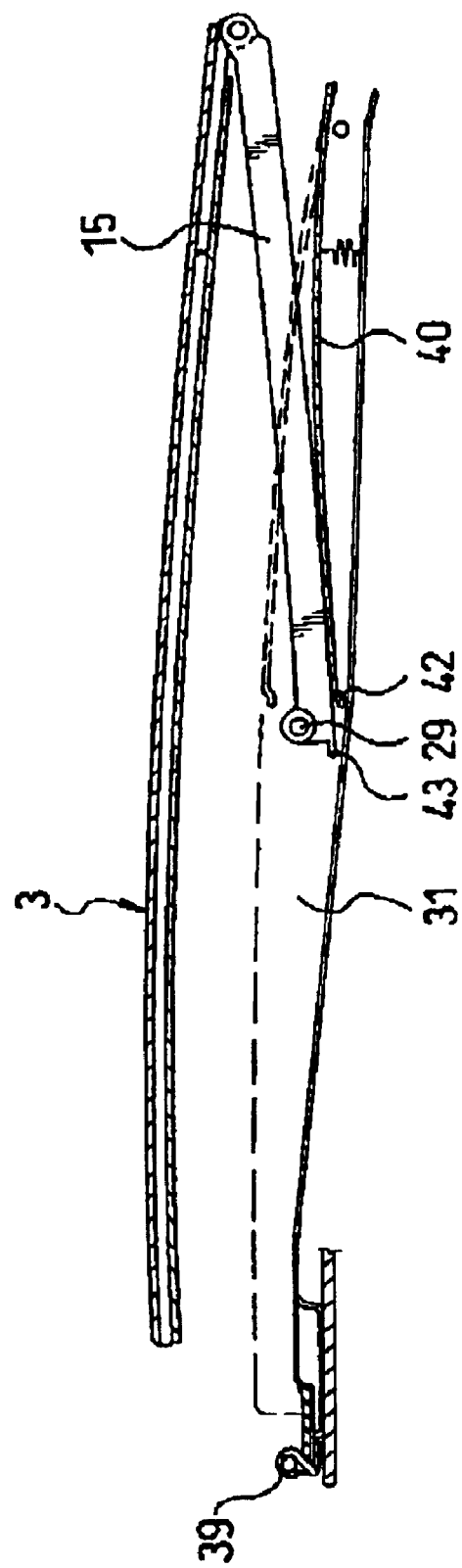

A screen 40 (FIG. 10) covers the rear section of the recess 31 between the hinge 29 on the back end of the rear connecting rod 15 and the rear edge 30 of the roof shell 23. The screen 40 is supported to be able to pivot around the rear axis of rotation 41 and is pre-tensioned upward into its cover position by a pre-tensioning means, for example, a spring 66. In the cover position, screen 40 is arranged flush with the top of the roof shell 23 and its downwardly curved front end 42 adjoins a projection 43 on the back end of the rear connecting rod 15 from underneath. If the rear connecting rod 15 is pivoted rearward around the hinge 29, the projection 43 presses the front end 42 of the screen 40 down (FIGS. 11 & 12) so that the rear connecting rod 15, which is being swung to the rear, can drop into the recess 31, and in doing so, presses the screen 40 down. When the roof 1 is closed the rear connecting rod 15 is lifted out of the recess 31 and its projection 43 guides the screen 40 into its cover position.

Due to the comparatively large bearing distance between the rear hinge 29 of the rear connecting rod 15 and the rear hinge 44 of the front connecting rod 14 on which it is pivotally supported on the bracket 21, as also between the front hinge 28 of the rear connecting rod 15 and the front hinge 45 of the front connecting rod 14 which forms the coupling to the front roof part 3, a four-bar mechanism with a large support base is formed which enables stable support of the front roof part 3.

The rear connecting rod 15 is made such that, in the closed position of the roof 1, it is arranged flush with the roof surface so that it visually covers the recess 31 and a cover for the front section of the recess 31 is therefore not necessary.

The screen 40, in an alternative configuration, can be attached securely on its back end to the recess 31 of the middle roof part 4 and can be made, for example, of plastic with a certain flexibility so that it bends down flexibly when it is pressed down on its front end 42 and by resting flat on the connecting rod 15. The reset force is made available by the plastic material.

Figure 14:
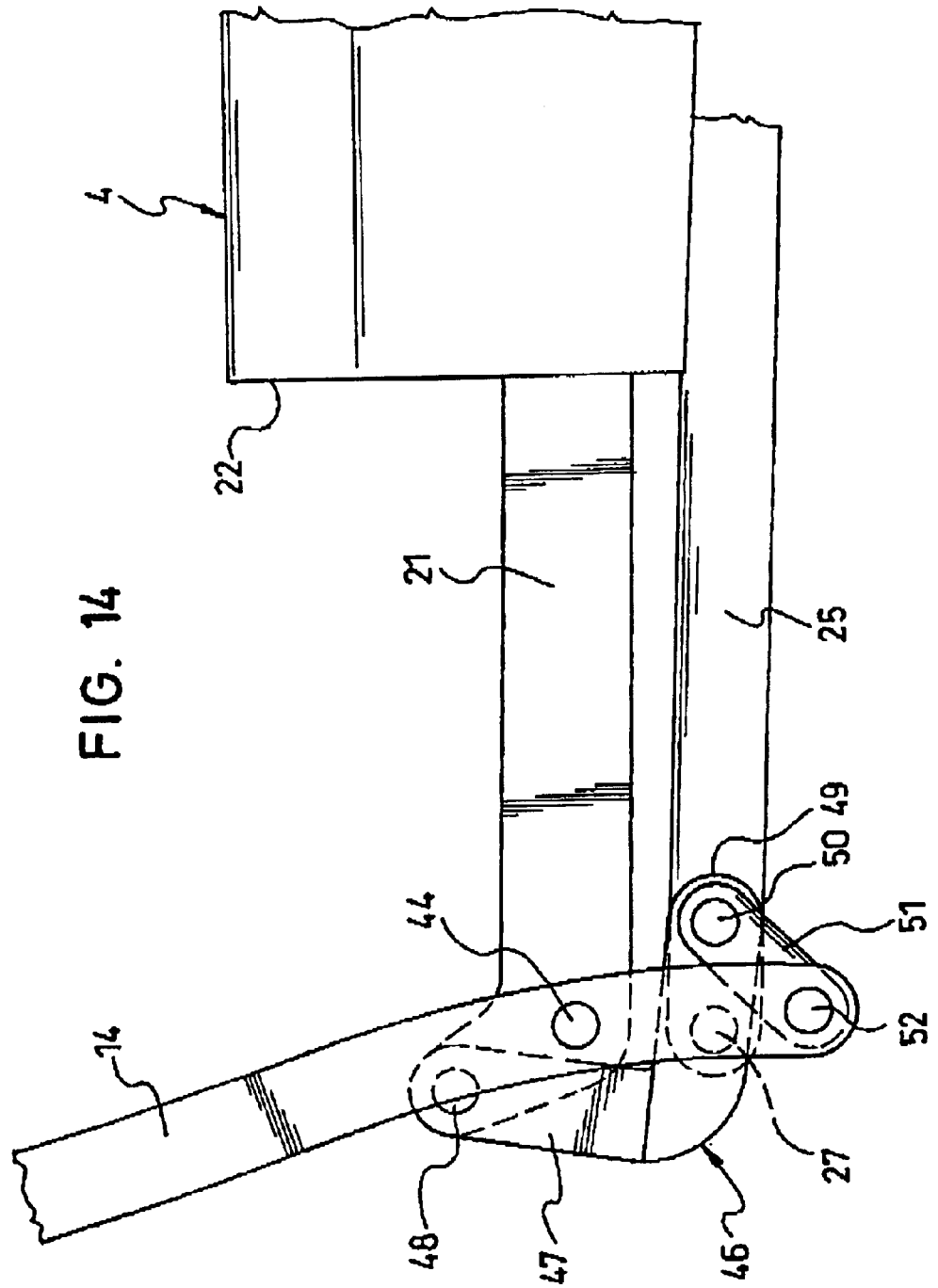
FIG. 14 is an enlarged extract from FIG. 3 showing the lever linkage for the front connecting rod of the front four-bar mechanism.
Figure 15:
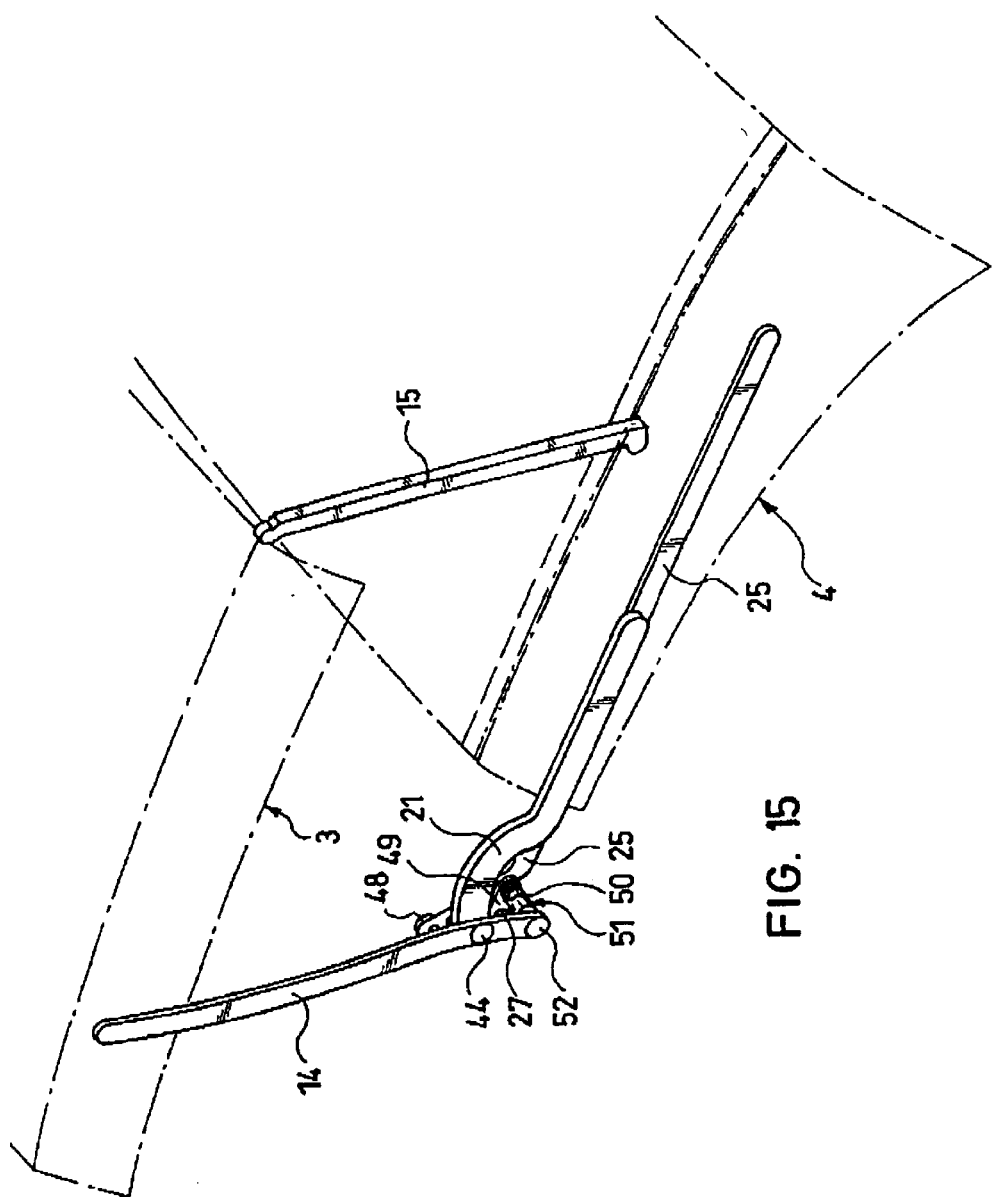
FIG. 15 is a schematic perspective overhead view of the lever linkage with the adjacent roof parts.

The lever linkage 20 which is located on the front end of the bracket 21 (see especially FIGS. 14 & 15) contains, for example, a right angle lever 46 with a first leg 47 which is pivotally supported at one end on the front end of the bracket 21 in a hinge 48 which is located above the hinge 44 which supports the front connecting rod 14. The coupling rod 25 is coupled to the second leg 49 of the angle lever 46 in a hinge 27 which is located set back from the end of the second arm 49. One end of a short connecting lever 51 is coupled to the end of the second lever 49 by means of a hinge 50, and the other end is pivotally connected by means of a hinge 52 to the end of the front connecting rod 14 which projects over the hinge 44.

The distance between the hinge 27 and the hinge 48 in the direction perpendicular to the coupling rod 25 forms the effective lever arm for application of the drive force to the lever linkage 20 and thus to the front connecting rod 14. By means of this design of the compactly built lever linkage 20, the effective lever arm is always large enough so that, at a large pivot angle of the front connecting rod 14, both in the closed position and also in the open position of the roof 1, the coupling rod 25 is relatively far away from the dead center position relative to the lever linkage 20 and to the hinge 48.

Figure 16:
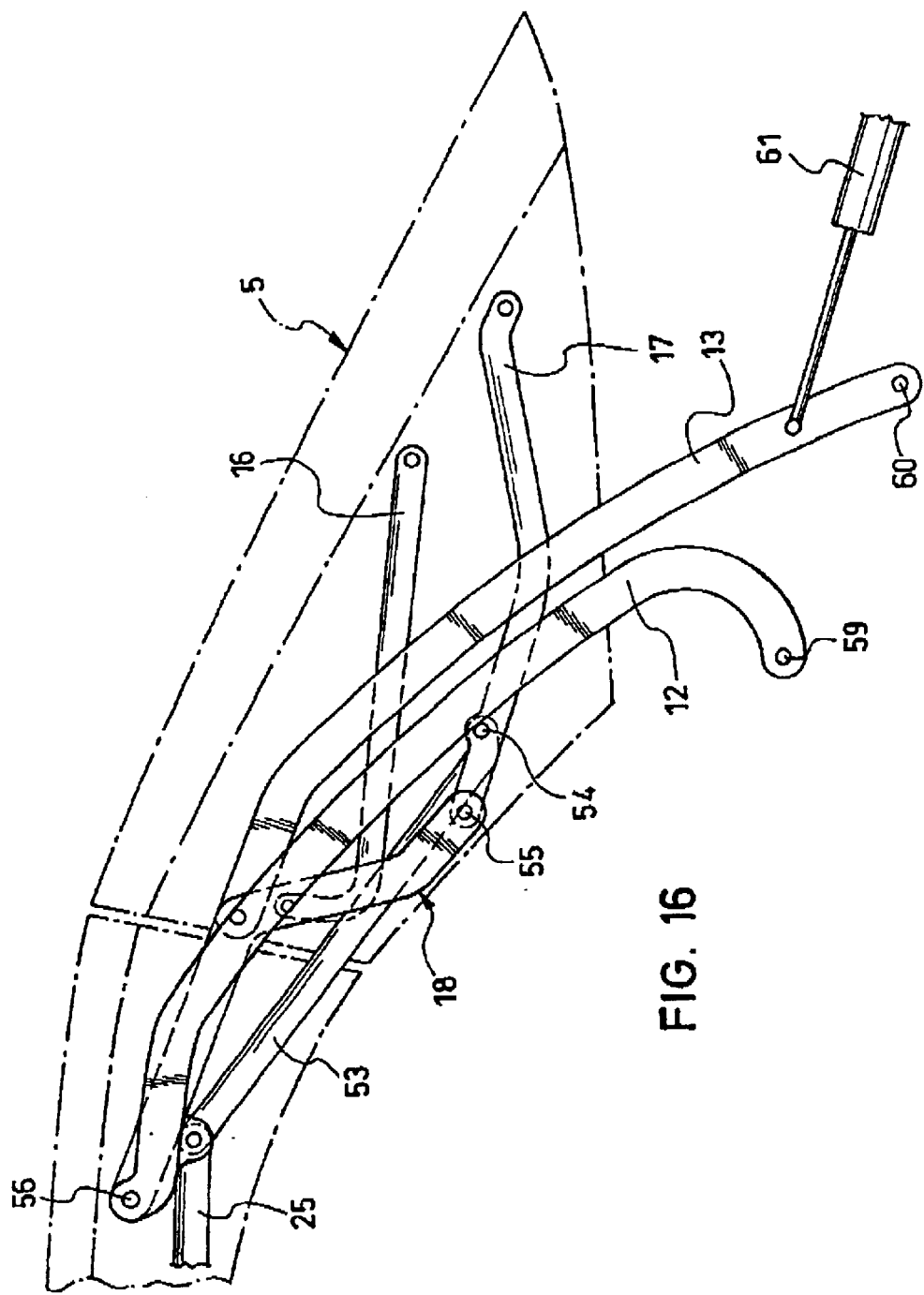
FIG. 16 is a side view that is enlarged as compared to FIG. 1 with the rear roof part in the closed position.
Figure 17:
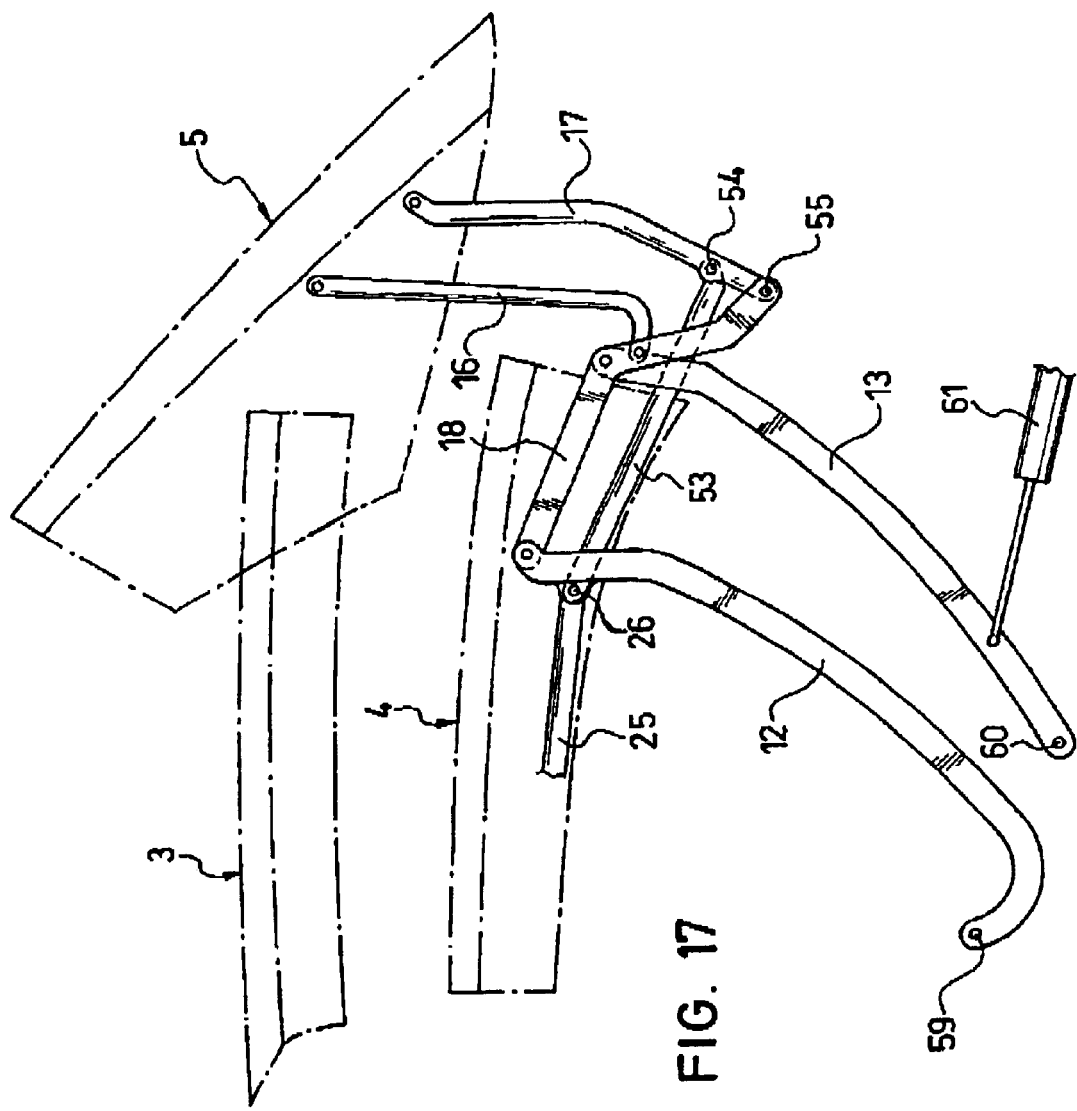
FIG. 17 is a side view showing the support of the middle and rear roof part that is enlarged relative to FIG. 5.

The drive for moving the rear roof part 5 (see especially FIGS. 16 & 17) contains a rear drive rod 53 which is coupled on one end to the hinge 26 attached to the main connecting rod 12 and at the other end to the hinge 54 which is adjacent to the hinge 55 which pivotally supports the rear lever 17 of the four-bar mechanism supporting the rear roof part 5 on the bearing arm 18. When the roof 1 is lowered, the main connecting rod 12 of the main four-bar mechanism is swung around its hinge 56, with which it is coupled to the bearing arm 18. The pivoting motion of the hinge 26 is transferred via the rear drive rod 53 and the hinge 54 to the rear lever 17. According to the establishment of the distances between the hinges 26, 56 and hinges 55, 54, the behavior of the rear lever 17 in motion can be set depending on the motion of the main connecting rod 12.

The front roof part 3 is swung at the same time via the drive rod 25 which is likewise coupled to the hinge 26. The drive rod 25 is omitted if the front roof part 3 has its own drive.

Figure 4:
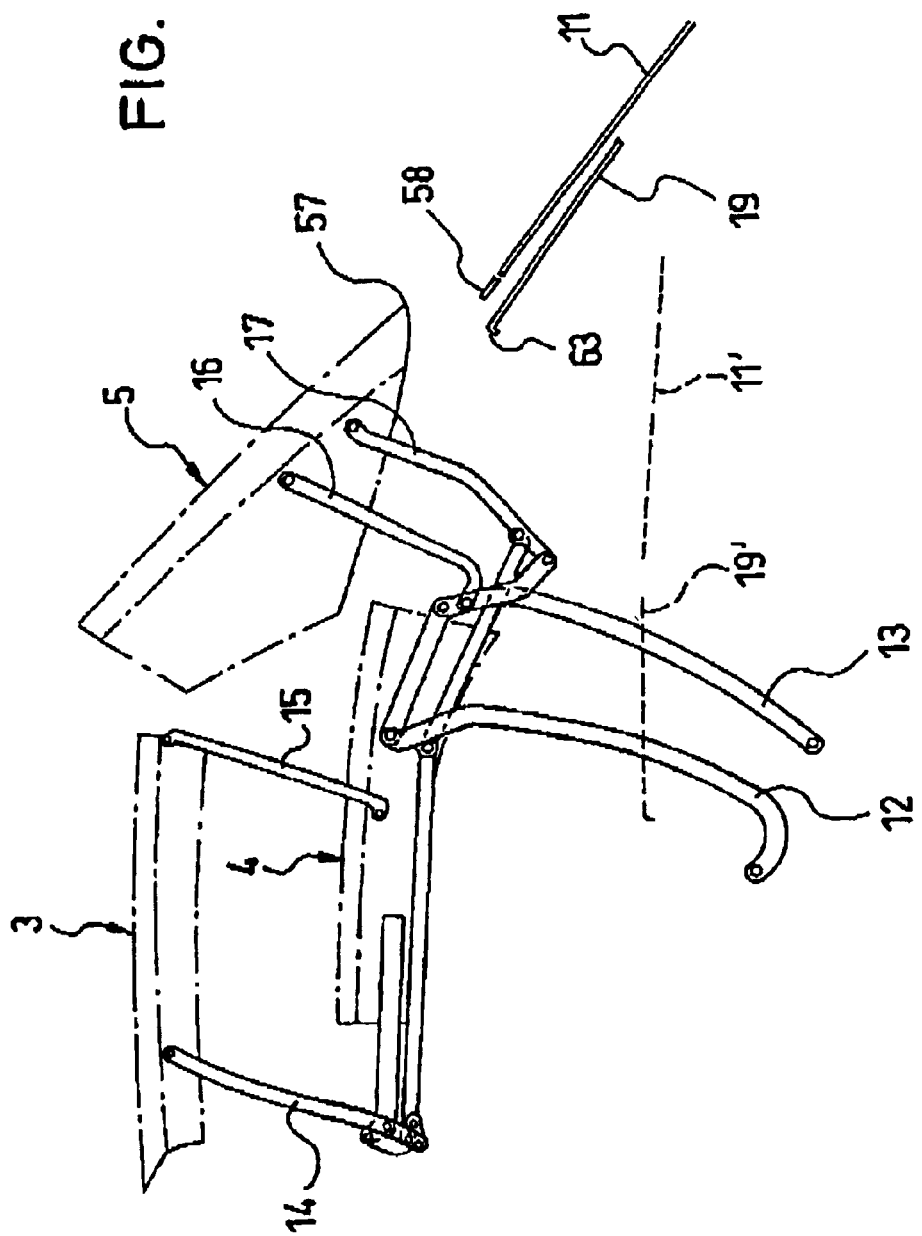
Figure 5:
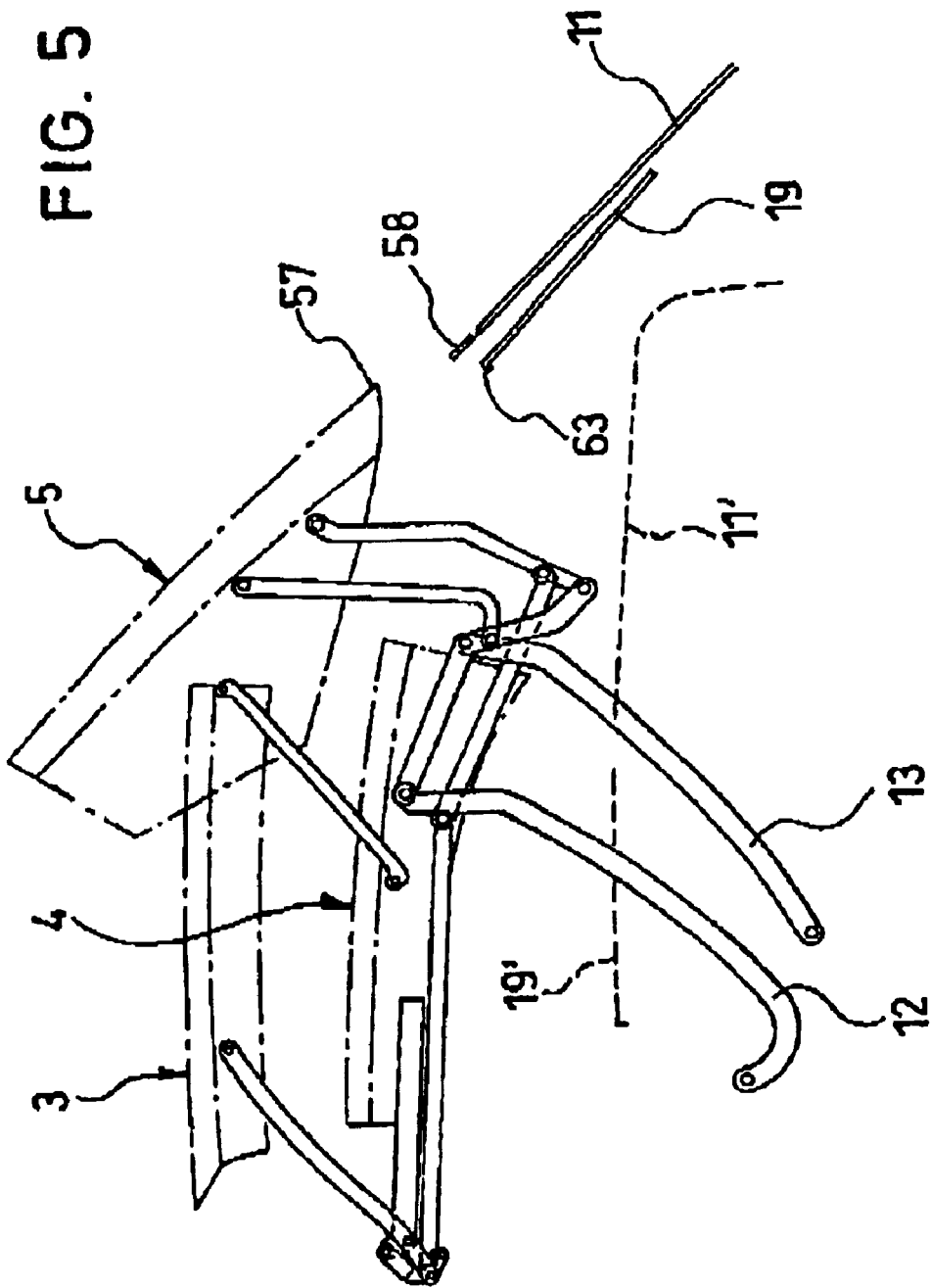
Figure 6:
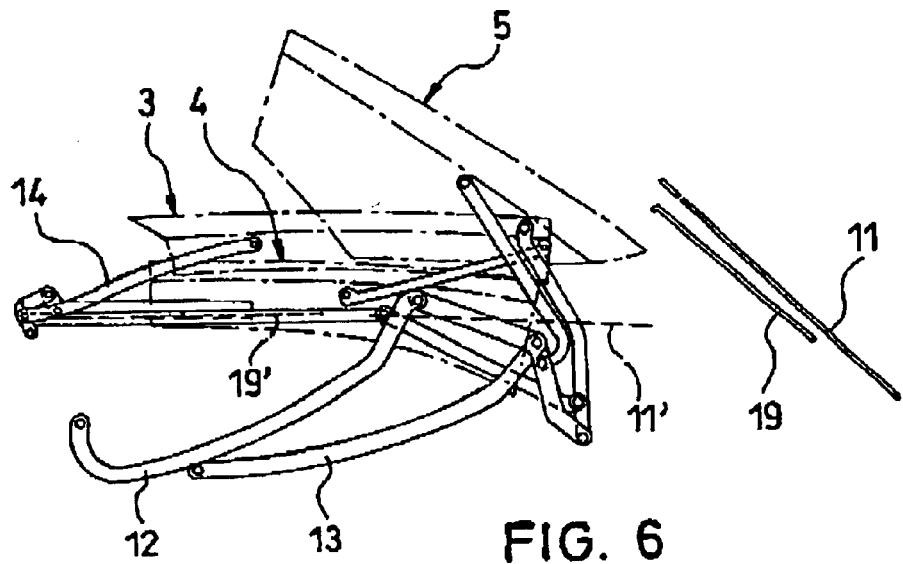
Figure 7:
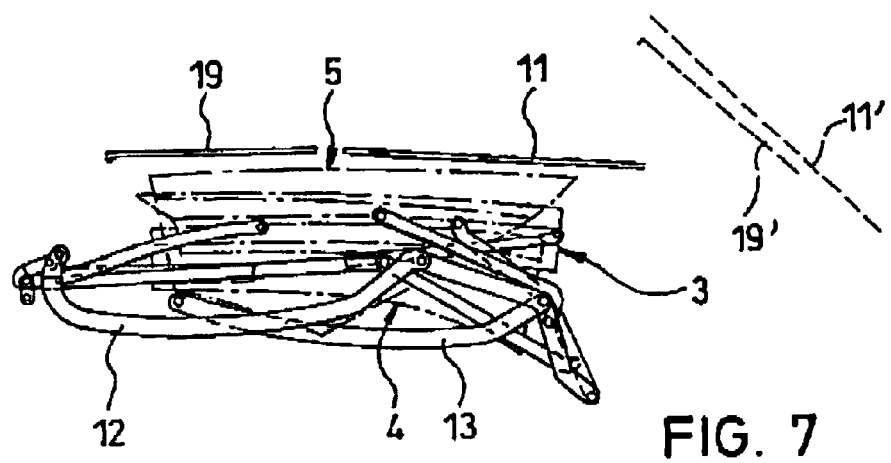

Due to the coupled forced control of the movements of the front roof part 3 and the rear roof part 5, during the lowering motion of the middle roof part 4, in the embodiment shown, the described rearward displacement of the hat rack 19 to under the lid 11 of the convertible top compartment is necessary so that the rear edge 57 of the rear roof part 5 can be lowered during the lowering motion in front of the front edge 58 of the opened lid 11 of the convertible top compartment (see FIGS. 4 to 6).

Figure 2:
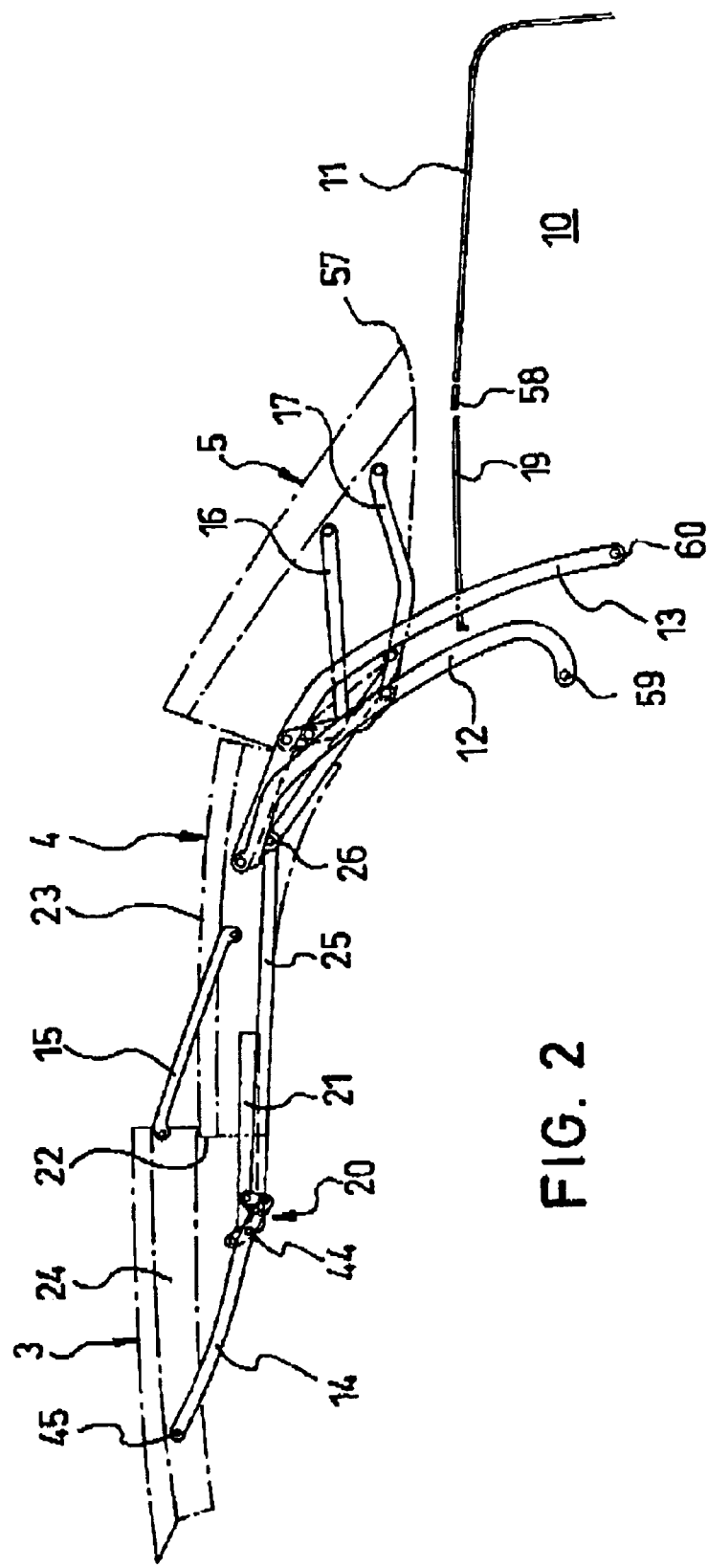
FIGS. 2 to 7 each show the three roof parts in a schematic side view in a respective position as the hardtop vehicle roof is lowered.
Figure 3:
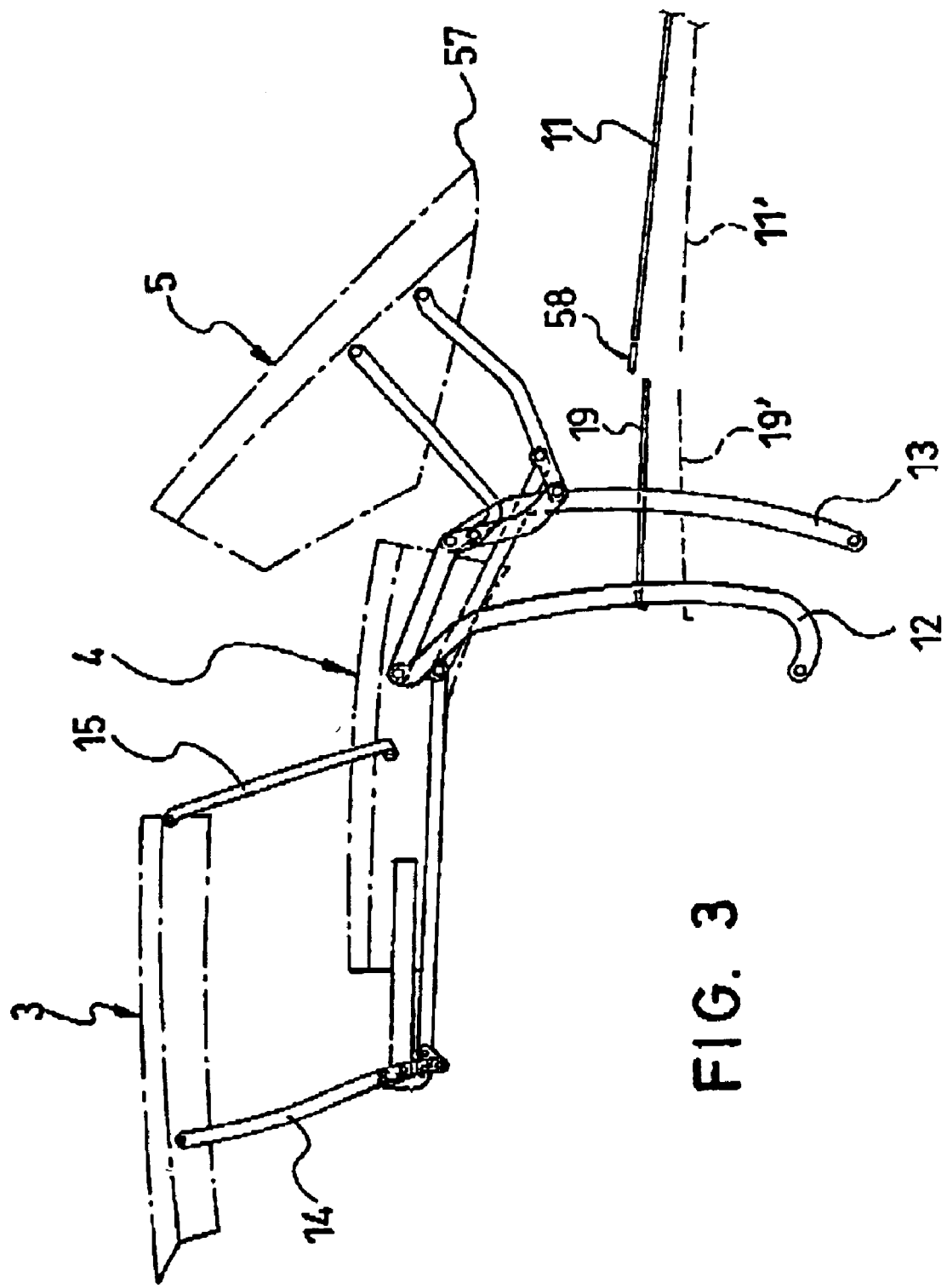

When the roof is closed, the rear edge 57 of the rear part 5, which edge contains a seal, in one simple sequence of motions, is placed, from above, on the already closed lid 11 of the convertible top compartment (motion of FIG. 2 to FIG. 1).

The driving of the main four-bar mechanism around the body-mounted hinges 59, 60 of the main connecting rod 12 and the main column 13 takes place, for example, by means of a hydraulically actuated piston-cylinder unit 61 which, for example, engages the main column 13.

In one alternative configuration, the coupling rod 25 is not connected to the hinge 26, but to its own drive means which is controlled via a control means for coordinated lowering motion.

Figure 18:
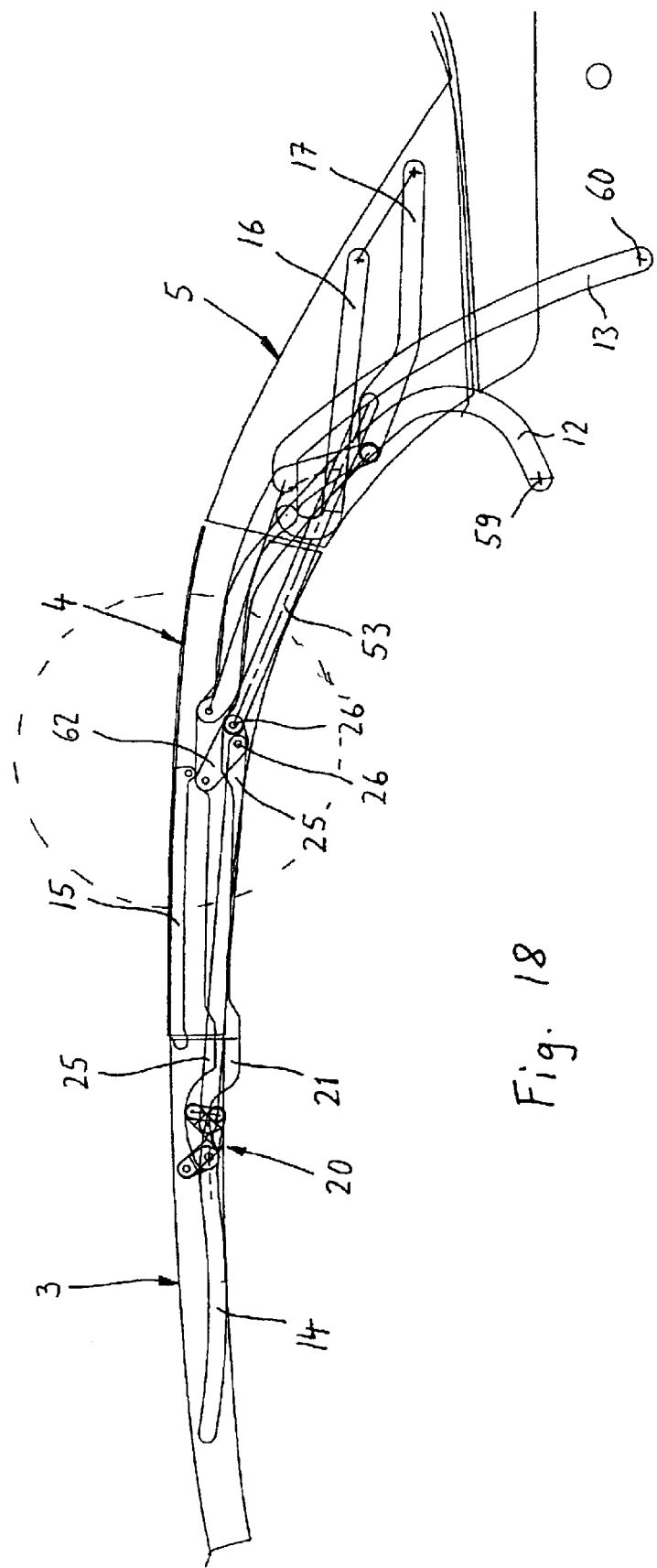
FIG. 18 is a partial schematic side view of another embodiment of a hardtop vehicle roof with a front, a middle and a rear roof part in the closed position.
Figure 19:
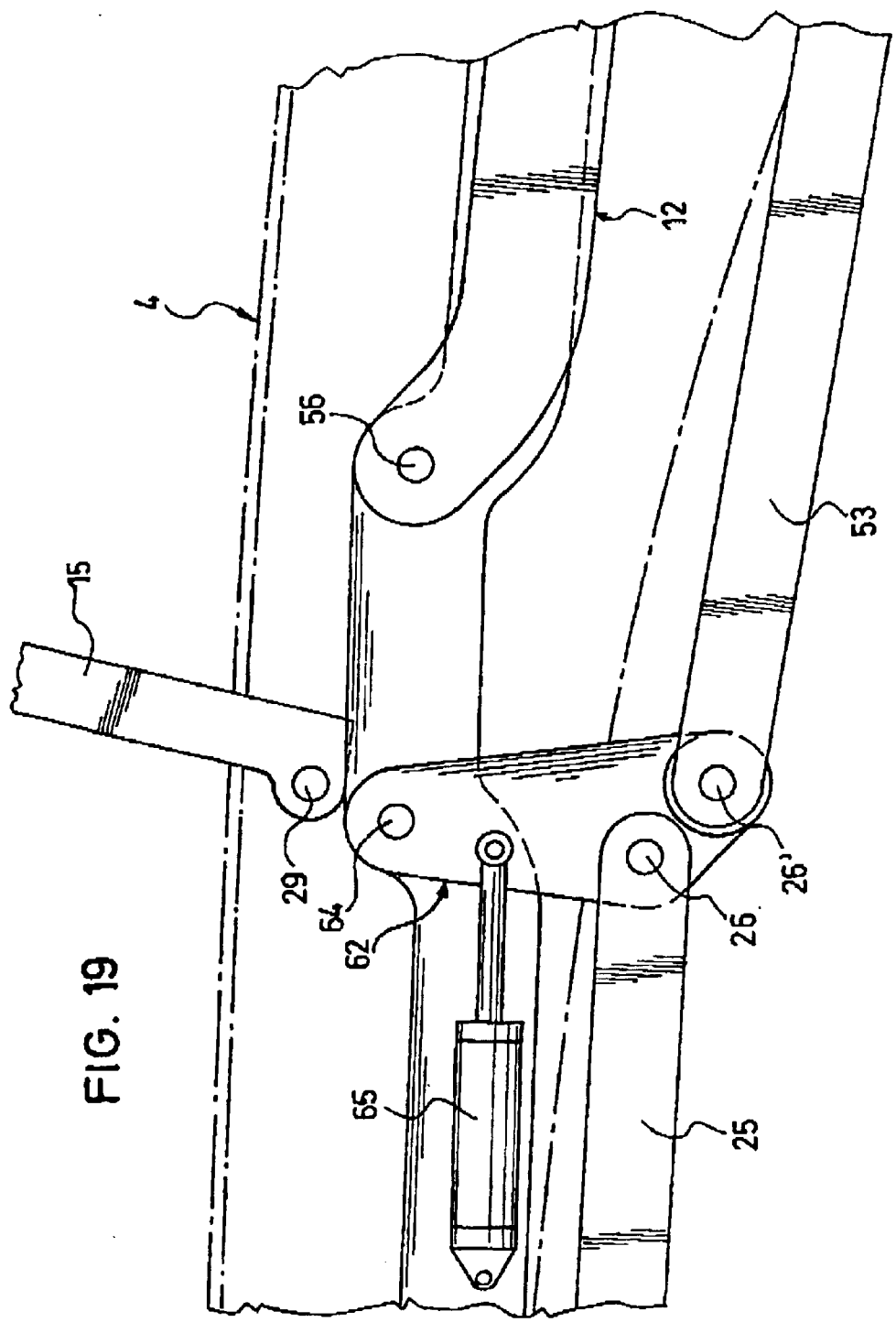
FIG. 19 is a side view of an enlarged extract of encircled area of the vehicle roof shown in FIG. 18 in the intermediate open position.

Another alternative configuration (see FIGS. 18 & 19) calls for the front coupling rod 25 and the rear drive rod 53 to be connected to one another in the hinges 26, 26'; however, these hinges 26, 26' are not attached to the main connecting rod 12, but to a pivot lever 62 which is supported by means of a hinge 64 on the middle roof part 4. A drive means 65 engages pivot lever 62 so that the movements of the front roof part 3 and the rear roof part 5 proceed coupled, but can be adjusted by controlling the drive means independently of the motion of the main four-bar mechanism or of the middle roof part 4. Thus, when the roof is lowered, first the front roof part 3 can be swung onto the middle roof part 4 and the rear roof part 5 onto the middle roof part 4 and onto the front roof part 3 located over it before the middle roof part 4 with the compactly arranged unit of the three roof parts is lowered to the rear into the convertible top compartment 10. Here, the hat rack 19 can be formed as a fixed unit with the lid 11 of the convertible top compartment since the lid 11 of the convertible top compartment is only opened when the rear roof part 5 has been swung over the middle roof part 4, and thus, the rear edge 57 of the rear roof part 5 can be easily moved past in front of the forward edge 63 of the hat rack 19.

In another embodiment of the motor vehicle roof (not shown), in the four-bar mechanism support of the front roof part 3, the rear connecting rod 15 is supported on the projecting section of the bracket 21 in front of the roof surface 23 of the middle roof part 4, so that the rear connecting rod 15 which is formed especially curved or at a right angle (according to the arrangement as is known from German Patent Application DE 199 62 070 A1 or German Patent DE 199 34 673 C1) is swung in front of and over the roof surface 23 of the middle roof part 4 and the described recess 31 is not necessary. The drive means can be formed according to the aforementioned statements.

In general, instead of the supports shown with four-bar mechanisms, also multiple hinge means with more than four hinges can also be used.

What is claimed is:

1. Motor vehicle roof, comprising:
   a front roof part and a following second roof part which are displaceable between a closed position which covers an interior space of a motor vehicle and a lowered position, in a rear roof storage space, which exposes the motor vehicle interior space, and a laterally arranged multiple hinge means movably supporting the front roof part on the second roof part so as to enable the front roof part to be raisable over the second roof part when being moved into said lowered position.

wherein the multiple hinge means has a rear connecting rod supported on the second roof part so as to be pivotable around a pivot axis which is set back from a front edge of the second roof part, and which swings upward out of a roof surface of the second roof part when the roof is being lowered into said lowered position, and wherein the multiple hinge means further comprises a front connecting rod which is pivotally supported in a hinge which is located on a bracket which projects forward from the second roof part in front of the roof surface of the second roof part.

2. Motor vehicle roof as claimed in claim 1, wherein the rear connecting rod in the closed position of the roof is flush with or below the roof surface of the second roof part.

3. Motor vehicle roof, comprising:

a front roof part and a following second roof part which are displaceable between a closed position which covers an interior space of a motor vehicle and a lowered position, in a rear roof storage space, which exposes the motor vehicle interior space, and a laterally arranged multiple hinge means movably supporting the front roof part on the second roof part so as to enable the front roof part to be raisable over the second roof part when being moved into said lowered position, wherein the multiple hinge means has a rear connecting rod supported on the second roof part so as to be pivotable around a pivot axis which is set back from a front edge of the second roof part, and which swings upward out of a roof surface of the second roof part when the roof is being lowered into said lowered position, wherein the rear connecting rod, in said closed position, is accommodated in an upwardly open recess in the second roof part; and further comprising a screen for covering a rear section of the recess, which extends rearward from the rear connecting rod, in the closed position of the roof.

4. Motor vehicle roof as claimed in claim 3, wherein the rear connecting rod in the open position is lowered at least partially into the rear section of the recess.

5. Motor vehicle roof as claimed in claim 3, wherein the recess is located between the middle part and a side part of the second roof part.

6. Motor vehicle roof as claimed in claim 3, wherein the rear connecting rod is adapted to press the screen down into the recess.

7. Motor vehicle roof as claimed in claim 6, wherein the screen is attached on a back end thereof to the second roof part and on its front end is adapted to be pressed down into the recess by a rear projection of the rear connecting rod.

8. Motor vehicle roof as claimed in claim 1, wherein the rear connecting rod is coupled to a rear end of the front roof part.

9. Motor vehicle roof as claimed in claim 1, wherein the rear connecting rod, in said closed position, is accommodated in an upwardly open recess in a middle roof part; and wherein the front connecting rod of the multiple hinge means, in a swung back position, is lowered into a front section of said recess.

10. Motor vehicle roof according to claim 1, wherein the front connecting rod of the multiple hinge means is pivotally supported by a pivot bearing which is located on the bracket which projects from the second roof part forward of the roof surface of the second roof part, and wherein the front connecting rod is driven via a lever linkage.

11. Motor vehicle roof as claimed in claim 10, wherein the lever linkage is forcibly coupled to a main drive for lowering the roof.

12. Motor vehicle roof as claimed claim 10, wherein the lever linkage is forcibly coupled to its own drive for lowering the roof.

13. Motor vehicle roof as claimed in claim 10, wherein the front connecting rod is driven via a drive rod and an interposed lever linkage which has a coupling lever which pivotable on the second roof part around a fixed pivot axis in an arrangement providing a drive lever arm for the drive motion of the drive rod.

14. Motor vehicle roof as claimed in claim 10, wherein the front connecting rod is driven via a drive rod and an interposed lever linkage which has a coupling lever which is pivotable on the second roof part around a fixed pivot axis and to which the drive rod is coupled, the fixed pivot axis of the coupling lever being arranged such that at least in one of two end positions of pivoting motion of the front connecting rod, the distance of the pivot axis from the coupling point of the drive rod relative to the coupling lever, which distance is lateral relative to the drive rod, is greater than a lateral distance of the pivot bearing of the front connecting rod from the coupling point of the drive rod to the coupling lever.

15. Motor vehicle roof, comprising: a front roof part and a following second roof part which are displaceable between a closed position which covers an interior space of a motor vehicle and a lowered position, in a rear roof storage space, which exposes the motor vehicle interior space, and a laterally arranged multiple hinge means movably supporting the front roof part on the second roof part so as to enable the front roof part to be raisable over the second roof part when being moved into said lowered position, wherein the multiple hinge means has a rear connecting rod supported on the second roof part so as to be pivotable around a pivot axis which is set back from a front edge of the second roof part, and which swings upward out of a roof surface of the second roof part when the roof is being lowered into said lowered position, and further comprising a third, rear roof part; wherein the second roof part is a middle roof part and is connected to a body of the vehicle by a second multiple hinge means, and wherein the third, rear roof part is pivotally supported via third multiple hinge means on the middle roof part.

* * * * *